United States Patent [19]

Vuillet

[11] Patent Number: 4,927,331

[45] Date of Patent: May 22, 1990

[54] BLADE FOR HIGH-PERFORMANCE SHROUDED PROPELLER, MULTI-BLADE SHROUDED PROPELLER PROVIDED WITH SUCH BLADES AND TAIL ROTOR ARRANGEMENT WITH SHROUDED PROPELLER FOR ROTARY WING AIRCRAFT

[75] Inventor: Alain E. Vuillet, Bouc Bel Air, France

[73] Assignee: Aerospatiale Societe Nationale Industrielle, Paris, France

[21] Appl. No.: 317,286

[22] Filed: Feb. 28, 1989

[30] Foreign Application Priority Data

Mar. 7, 1988 [FR] France .................. 88 02873

[51] Int. Cl.$^5$ .............................. B63H 1/26
[52] U.S. Cl. ................. 416/238; 416/DIG. 2; 416/DIG. 5
[58] Field of Search ............ 416/243, 238, DIG. 2, 416/DIG. 5, 242

[56] References Cited

U.S. PATENT DOCUMENTS

| | | | |
|---|---|---|---|
| 3,506,219 | 4/1970 | Mouille et al. | 244/17.21 |
| 3,594,097 | 7/1971 | Mouille et al. | 416/104 |
| 4,281,966 | 8/1981 | Duret et al. | 416/134 |
| 4,392,781 | 7/1983 | Mouille et al. | 416/DIG. 2 |
| 4,459,083 | 7/1984 | Bingham | 416/DIG. 2 |
| 4,569,633 | 2/1986 | Flemming Jr. | 416/DIG. 2 |
| 4,585,391 | 4/1986 | Vuillet et al. | 415/914 |
| 4,652,213 | 3/1987 | Thibert et al. | 416/DIG. 2 |
| 4,773,825 | 9/1988 | Rodde et al. | 416/DIG. 2 |

FOREIGN PATENT DOCUMENTS 1050902 1/1954 France .
2590229 5/1987 France .

Primary Examiner—Robert E. Garrett
Assistant Examiner—John T. Kwon
Attorney, Agent, or Firm—Fisher, Christen & Sabol

[57] ABSTRACT

This invention relates to a blade for shrouded propeller, wherein: in plan, its aerodynamically active part presents a rectangular shape; and the maximum relative camber of the successive profiles constituting the aerodynamically active part of the blade increases from a value close to 0 to a value close to 0.04; the twist of the aerodynamically active part of the blade decreases from a first value close to 12° to a second value close to 4°, then increases to a third value close to 4.5°; and the maximum relative thickness of said successive profiles decreases from a value close to 13.5% to a value close to 9.5%.

12 Claims, 6 Drawing Sheets

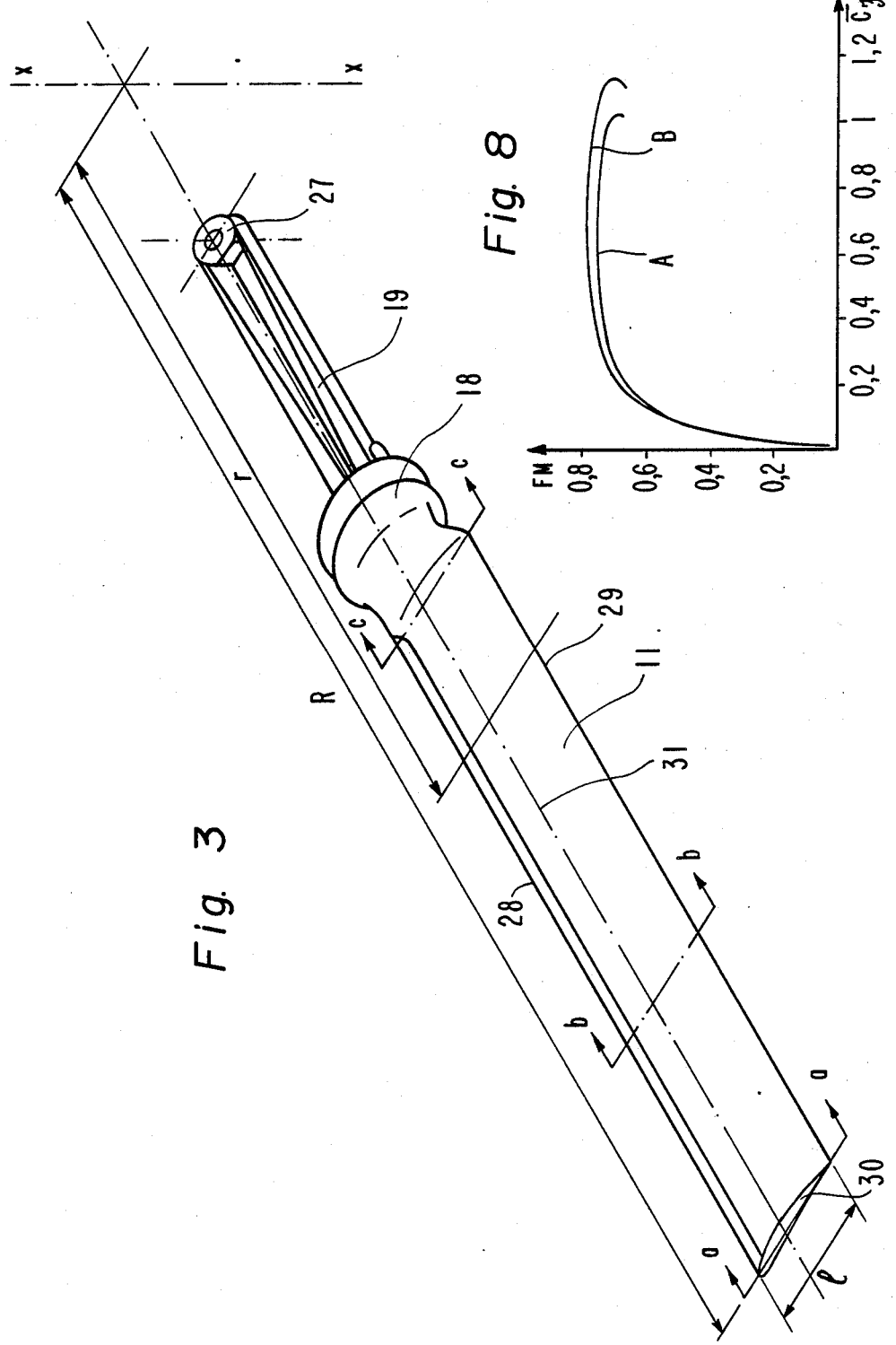
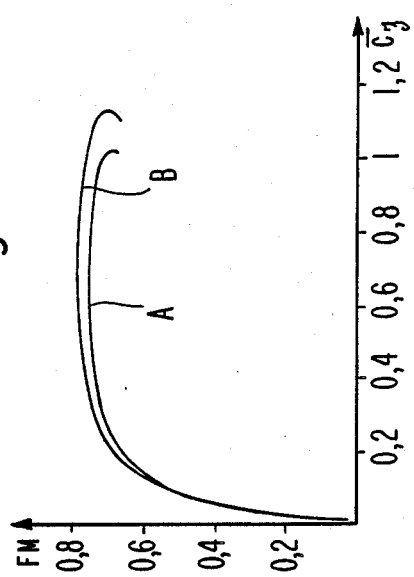

BLADE FOR HIGH-PERFORMANCE SHROUDED PROPELLER, MULTI-BLADE SHROUDED PROPELLER PROVIDED WITH SUCH BLADES AND TAIL ROTOR ARRANGEMENT WITH SHROUDED PROPELLER FOR ROTARY WING AIRCRAFT

FIELD OF THE INVENTION

The present invention relates to blades for high-performance shrouded propellers, as well as to the shrouded propellers provided with a plurality of such blades. Its object is to increase the thrust or the pull delivered by such a shrouded propeller and, correlatively, to reduce the power necessary for driving this shrouded propeller in rotation. The present invention is particularly, but not exclusively, appropriate to be employed for auxiliary tail rotors of rotary wing aircraft.

BACKGROUND OF THE INVENTION

It is known that, with respect to a free propeller of the same diameter, a propeller shrouded in a duct theoretically makes it possible to obtain a substantially equal thrust or pull, with a gain in power of the order of 30%.

In fact, the duct improves the yield of the propeller installed inside, with respect to a free propeller, for two reasons:

the circulation of the air through the duct creates a depression on the shroud and therefore a thrust of the fairing in its assembly, which is substantially equal to the thrust of the propeller itself;

the flow in the vicinity of the shroud being in depression downstream of the propeller, the flux does not contract, contrarily to what occurs downstream of a free propeller, which has for its consequence to increase the yield of the propeller, and this all the more so as the diffusion of the fluid stream is increased without stall in the shroud.

This is why, in numerous applications in which, in limited dimensions, it is question of creating a force of aerodynamic origin by a propeller, the solution of a shrouded propeller has proved more advantageous than that contributed by a free propeller.

Among such applications may be mentioned vertical take-off and landing aircraft, in which one or more vertical-axis shrouded propellers are integrated in the fixed wing or fuselage; vehicles with lift by air-cushion, of which the pressurized air generators blowing towards the ground are propellers housed inside fairings, themselves incorporated in the body of the vehicle; and, finally, variable-pitch fans, for example those incorporated in a gas conduit in order to create a considerable circulation of said gas in the conduit.

A particularly advantageous application has been made thereof to produce the tail rotor of helicopters.

It is known that, on such aircraft with lifting rotary wing, and in particular on mechanically driven monorotor helicopters, in order permanently to balance the counter torque on the fuselage resulting from the rotation of the rotary wing, and in order to control the aircraft on its yaw axis, an auxiliary rotor is provided, disposed in the vicinity of the end of the tail of the aircraft and exerting a transverse thrust which is adaptable to all the flight conditions. This auxiliary tail rotor therefore exerts on the aircraft a balance torque of direction opposite the counter torque of the main rotor to its rotation by the engine or engines, i.e. in fact of the same direction as the driving torque of the lifting rotary wing.

Controlled variations of this balance torque by controlling the pitch of the blades of the anti-torque auxiliary rotor also enable the pilot to control the course of the helicopter about its yaw axis.

However, and particularly on helicopters of low or average tonnage, the conventional anti-torque rotor constituted by a free propeller is particularly vulnerable to outside aggressions: it may touch the ground staff or touch the ground itself or any obstacle, all collisions which directly compromise the balance of the helicopter and its safety in flight.

It is particularly in order to avoid these serious drawbacks that Applicants have developed on helicopters of low and average tonnage, a multiblade tail rotor arrangement, shrouded inside the vertical stabilizer of these apparatus.

Such an installation is rendered possible and advantageous by the fact that the diameter of such a shrouded rotor may be relatively reduced with respect to that of a free rotor of equivalent efficiency.

Such arrangements of anti-torque shrouded rotors are for example described in U.S. Pat. Nos. 3,506,219, 3,594,097 and 4,281,966.

Of course, it is sought to obtain from this auxiliary rotor, under the optimum conditions of yield as far as the driving power is concerned, a sufficiently high maximum thrust to satisfy the most demanding flight conditions and, by controlling the pitch of the blades, it is provided to take only a part of this maximum thrust adapted to the other flight cases.

It is known that the lifting efficiency of the rotary wings is generally characterized, for stationary operational conditions, by a parameter known under the term of "figure of merit" which is the ratio between the minimum power for obtaining a given pull or thrust and the real power effectively measured.

For a shrouded propeller, the expression of this parameter is given by the following known formula:

$$FM = \frac{1}{2\sqrt{\delta}} \frac{T}{P} \sqrt{\frac{T}{\rho \pi R^2}}$$

in which
FM is the figure of merit,
T the desired thrust or pull,
P the necessary power to be furnished to the propeller,
$\rho$ the density of the air,
R the radius of the propeller, and
$\sigma$ the coefficient of diffusion of the aerodynamic flux on the surface, this coefficient $\sigma$ being equal to the ratio $S\infty/S$, with $S\infty$ representing the surface of the flux at downstream infinite and S being the surface of the disc formed by the propeller in rotation.

In order to increase the figure of merit with fixed power and dimensions, it is therefore necessary to increase the thrust or pull of the propeller.

It is a particular object of the present invention to provide a blade for shrouded propeller, of which the geometry of the aerodynamically active part is optimalized so that the propeller delivers a thrust or a pull which is as great as possible, whilst consuming a power which is a low as possible for drive thereof.

SUMMARY OF THE INVENTION

To that end, according to the invention, the blade for shrouded propeller comprising a tunnel and a rotor with multiple blades coaxial to said tunnel, said rotor comprising a rotating hub of which the radius is of the order of 40% that of said tunnel and on which said blades are mounted via blade shanks, is noteworthy:

in that, in plan, the aerodynamically active part of said blade presents, beyond the blade shank, a rectangular shape with the result that the successive profiles constituting said aerodynamically active part all have the same chord 1 and that the end section of said aerodynamically active part is straight; and in that, along the span of the blade counted from the axis of the tunnel, between a first section of which the relative span (i.e. with respect to the total span of the blade) is close to 45% and the end section of said blade:

the maximum relative camber of the successive profiles constituting said aerodynamically active part of the blade is positive and increases from a value close to 0 to a value close to 0.04;

the twist of said aerodynamically active part of the blade decreases from a first value close to 12° at said first section to a second value close to 4° at a second section of which the relative span is close to 0.86, then increases from this second section to a third value close to 4.5° at said end section of blade; and the maximum relative thickness of said successive profiles decreases from a value close to 13.5% to a value close to 9.5%.

Applicatns have, in fact, found that such a combination of evolutions of camber, of twist and of thickness of the profiles, associated with a rectangular shape of the blades (the leading edge and the trailing edge being rectilinear and parallel), led to a blade presenting excellent aerodynamic properties (shown hereinafter) and excellent properties of mechanical strength, in particular by an increase in the section of blade in the vicinity of the root on the hub.

According to other advantageous features of the present invention:
(a) said maximum relative camber increases virtually linearly from this value close to 0 to a value equal to 0.036 for a relative span equal to 0.845, passing through values 0.01 and 0.02 respectively for the relative spans 0.53 and 0.66, then increases from this value equal to 0.036 for the relative span equal to 0.845 up to a value equal to 0.038 for the relative span equal to 0.93, and, finally, is constant and equal to 0.038 between the relative spans 0.93 and 1;
(b) the root of said blade presents evolutive profiles of which the maximum relative camber is negative and increases from a value substantially equal to −0.013 for a relative span equal to 0.40 to said value close to 0 for a relative span equal to 0.45;
(c) between the relative spans 0.45 and 1, the evolution of the twist is at least substantially parabolic, with a minimum at the relative span of 0.86;
(d) the axis of twist of said aerodynamically active part is parallel to the line of leading edge and to the line of trailing edge thereof and is distant from said line of leading edge by a distance approximately equal to 39% of the length of the chord of the profiles;
(e) the twist of the root of said blade increases from said value close to 8° for a relative span close to 0.38 to said value close to 12° for the relative span equal to 0.45;
(f) the maximum relative thickness of the profiles decreases linearly from a value close to 13.9% for a relative span equal to 0.40 to a value close to 9.5% for a relative span equal to 0.93, and is constant and equal to said value close to 9.5% between the relative spans respectively equal to 0.93 and 1.

The profiles constituting said blades are preferably those which will be defined hereinafter.

BRIEF DESCRIPTION OF THE DRAWINGS

The invention will be more readily understood on reading the following description with reference to the accompanying drawings, in which:

FIG. 3 shows in perspective a rotor blade according to the present invention.

FIG. 8 shows, as a function of the maximum coefficient of lift, the variation of the figure of merit of a rotor equipped with blades according to the invention, compared with a known rotor.

DETAILED DESCRIPTION OF THE DRAWINGS referring now to the drawings, the helicopter tail 1 shown in FIGS. 1 and 2 comprises a fuselage part 2 and a vertical stabilizer 3. At the base of the vertical stabilizer 3 is arranged a tunnel 4 passing right through the fuselage part 2, with the result that this tunnel comprises an air intake 5 on one side of the fuselage and an air outlet 6 on the other side of said fuselage (cf. FIG. 2).

Figure 1:
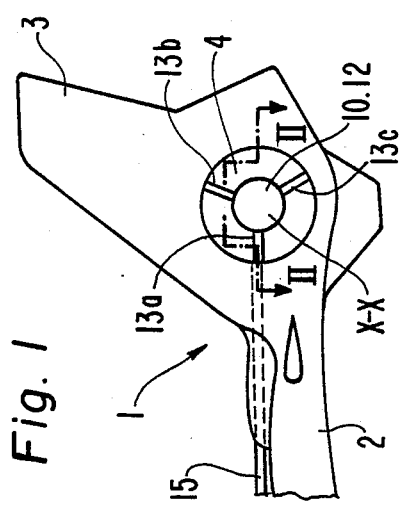
FIG. 1 is a partial view of the rear part of a helicopter provided with a shrouded rotor arrangement generating a transverse air flow in order to balance the driving torque of the main lifting rotor (not shown).

The tunnel 4 presents a shape of revolution about an axis X—X, transverse to the longitudinal axis L—L of the helicopter. For example, the air intake 5 presents a rounded peripheral edge 7 which is extended, towards the air outlet 6, by a cylindrical portion 8 itself extended up to said air outlet 6 by a divergent portion 9.

In tunnel 4 is mounted a rotating hub 10 provided with a plurality of blades 11. This rotating hub 10 is borne by a fixed hub 12 fast with the structure of the helicopter via three arms 13a, 13b and 13c. The rotating hub 10 and the fixed hub 12 are cylindrical in shape and are centred on axis X—X of the tunnel 4. The rotating hub 10 is disposed towards the air intake 5, so that, for example, the ends of the blades 11 are located opposite the cylindrical portion 8 of the tunnel 4, whilst the fixed hub 12 is located towards the air outlet 6.

In known manner, inside the fixed hub 12 is located a mechanism 14 for driving the rotating hub 10 in rotation, itself driven by a shaft 15, moved by the principal engine or engines (not shown) of the aircraft intended for driving the lifting rotary wing (likewise not shown). In this way, as explained hereinabove, the blades 11 of the rotating hub 10 create the air flow which generates the transverse thrust necessary for the equilibrium of the helicopter in yaw.

Likewise in known manner, in order to vary the intensity of this transverse thrust, there is provided, inside the fixed hub 12 and partially the rotating hub 10, a system 16 for controlling the angle of pitch of the blades 11, actuated via a control rod 17.

The roots 18 of the blades 11 are mounted to rotate on the rotating hub 10 and are connected to the pitch control system 16. Said blade roots 18 are connected to the retaining and drive mechanism 14 by torsion bars 19.

Figure 2:
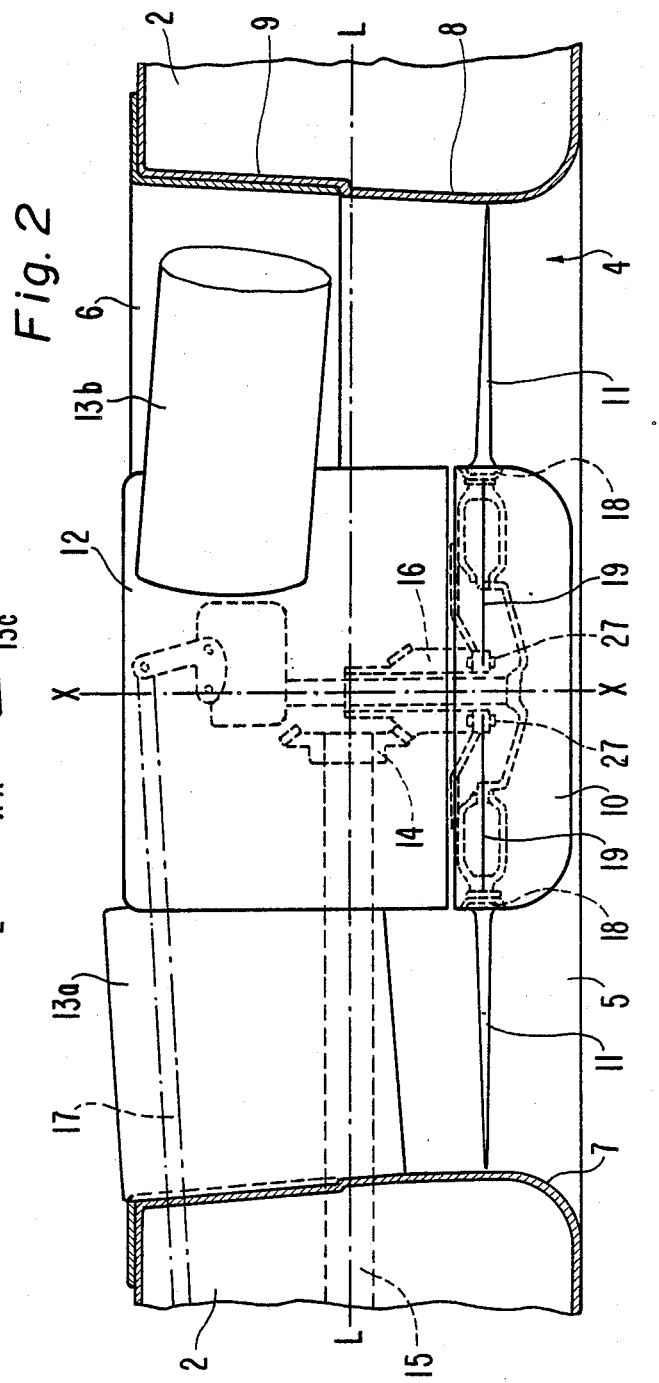
FIG. 2 is an enlarged section along line II—II of FIG. 1.

As shown in FIG. 2, one of the arms 13a for supporting the fixed hub 12 serves as fairing for the shaft 15 and for the control rod 17.

The arms 13a, 13b and 13c may be uniformly distributed at 120° about axis X—X and disposed with a certain relative offset to the rear of the plane of the blades 11.

FIG. 3 shows in perspective a blade 11 of the rotary hub 10, with its blade root 18 and its torsion bar 19, disregarding said hub. Likewise shown is the axis of rotation X—X of the rotating hub 10, as well as a part 27 of the means for fastening the bar 19, and therefore the blade 11, to the retaining and drive mechanism 14.

The blade 11 comprises, in plan view, a rectilinear line of leading edge 28. The line of trailing edge 29 is also rectilinear. In addition, the rectilinear lines of leading edge 28 and of trailing edge 29 are parallel to each other.

In this way, in plan, the blade 11 presents a rectangular shape, with a constant chord of profile 1 from the blade root 18 up to its outer end section 30.

The blade 11 presents a span R, counted from the axis of rotation X—X of the rotating hub 10. Hereinafter, the position in span of a profile (or of a section) of the blade 11 will be designated by the distance r separating this profile (or this section) from the axis of rotation X—X of said rotating hub 10, and more especially by the relative span r/R corresponding to this position.

The pitch control axis 31 of the blade 11 is parallel to lines 28 and 29 of the leading edge and trailing edge.

Figure 4A:
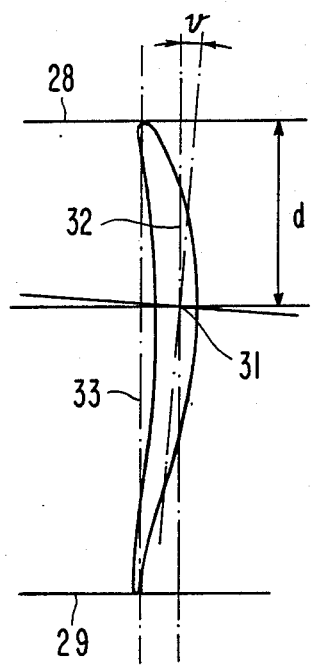
FIGS. 4a, 4b and 4c are sections of the blade shown in FIG. 3, respectively along planes a—a, b—b and c—c thereof.
Figure 4B:
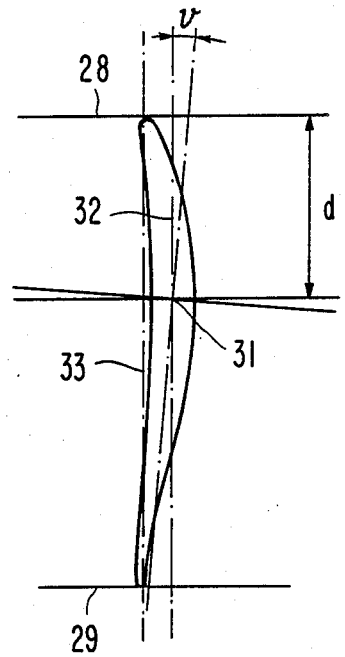
Figure 4C:
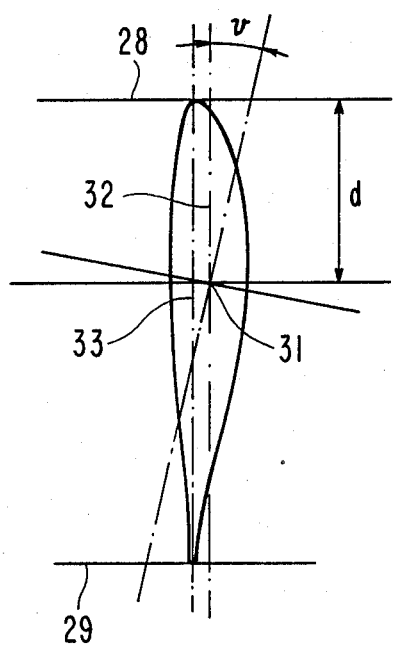

The sections of the blade 11 shown in FIGS. 4a, 4b and 4c correspond respectively to the planes of section a—a, b—b and c—c of FIG. 3, i.e. to planes of which the relative spans r/R with respect to axis X—X are respectively equal to 100%, 73% and 45%.

The sections of FIGS. 4a, 4b and 4c show that the axis of twist v of the blade in span is merged with the pitch control axis 31 and that this axis of twist, which is distant from the leading edge line 28 by a distance d close to 39% of the length of the chord 1, passes through the plane of mid-thickness 32 of the corresponding profiles, this plane 32 being parallel to the plane of the chords 33.

FIGS. 4a, 4b and 4c show, in addition, that the thickness, the twist and the camber of the blade 11 vary considerably in span.

In the embodiment of a blade 11 according to the invention, illustrated by FIGS. 5a to 5d, it may be seen that the distance separating the axis X—X from the fastening means 27 is equal to 0.095 R, the torsion bar 19 extends from 0.095 R to 0.38 R, the blade root 18 extends from 0.38 R to 0.45 R and that the aerodynamically active part of the blade 11 proper extends from 0.45 R to R.

The maximum relative camber K/1 (i.e. with respect to the chord 1) of the successive profiles constituting the aerodynamically active part of said blade is negative and increases from a value equal to −0.013 for the section of blade root 18 disposed at 0.40 R up to 0 for the section of blade root 18 disposed at 0.45 R. Between 0.45 R and 0.845 R, the maximum relative camber of the profiles of the aerodynamically active part of the blade 11 increases considerably and regularly (and preferably substantially linearly) from value 0 to a value close to 0.036, passing through a value close to 0.01 for the section of blade disposed at 0.53 R and through a value close to 0.02 for the section located at 0.66 R. Between 0.845 R and 0.93 R, the maximum relative chamber increases slightly from the value 0.036 to value 0.038, then remains constant at this value 0.038 between 0.93 R and R (cf. FIG. 5b).

Figure 5A:
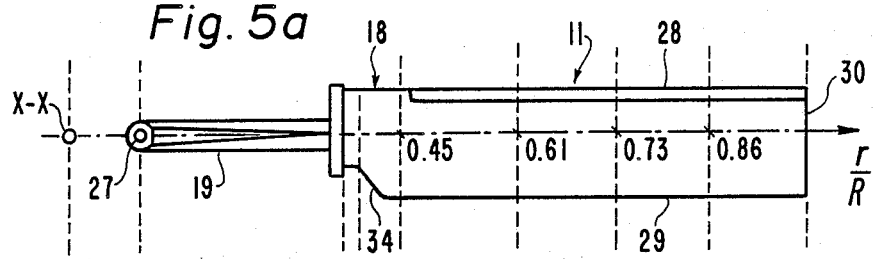
FIGS. 5a, 5b, 5c and 5d schematically illustrate, along the span of the blade counted from the axis of rotation X—X of the rotor, respectively the shape in plan of an embodiment of said blade, the variation of relative camber, the variation of the twist and the variation of relative thickness.
Figure 5B:
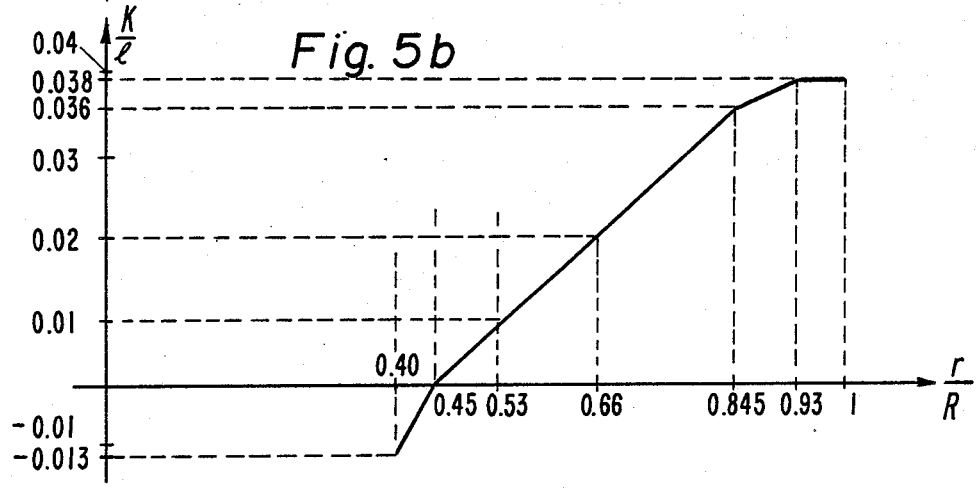
Figure 5C:
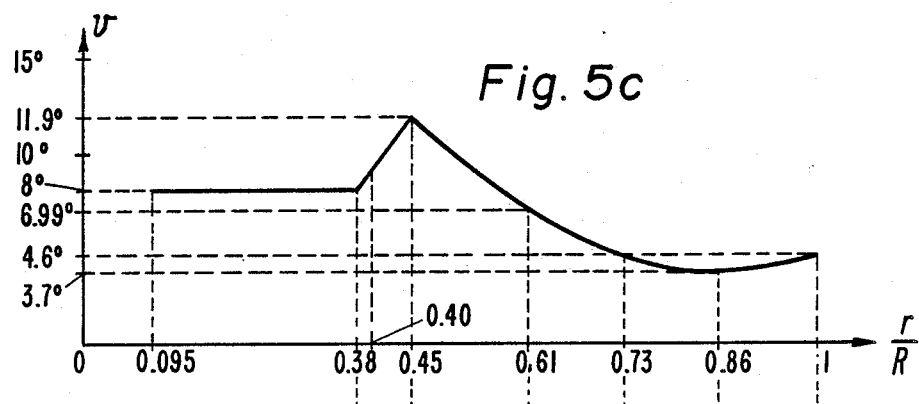
Figure 5D:
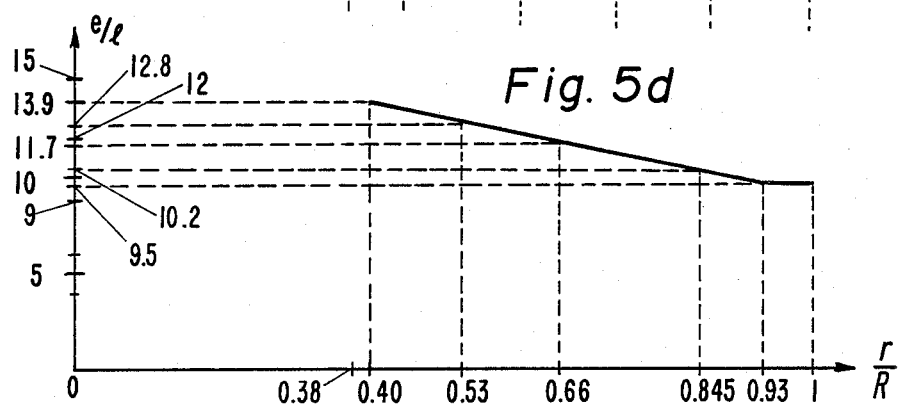

As illustrated in FIG. 5c, the twist v of the blade root 18 increases considerably from 0.038 R to 0.45 R, passing from 8° to 11.9°. From 0.45 R to 0.86 R, the twist of the blade 11 decreases from 11.9° to 3.7°, passing through values 6.99° at 0.61 R and 4.6° at 0.73 R. Finally, from 0.86 R to R, the twist increases again from 3.7° to 4.6°. Between 0.45 R and R, the variation of the twist v is preferably at least substantially parabolic.

The maximum relative thickness $1^e$ of the blade root 18 and of the blade 11 decreases linearly from the value 13.9% for the section disposed at 0.40 R to 9.5% for the section disposed at 0.93 R, passing through values 12.8%, 11.7% and 10.2% respectively for the sections disposed at 0.53 R, 0.66 R and 0.845 R. Between 0.93 R and R, this relative thickness is constant and equal to 9.5% (cf. FIG. 5d).

In this way, in order to generate the blade 11 and its blade root 18, a certain number of basic profiles may be defined, intended to constituted determined sections thereof and to cause the intermediate profiles of a portion of blade included between two basic profiles, to evolve regularly, in order to satisfy the relative evolutions of thickness and of camber. It then suffices to set each of said basic profiles and said intermediate profiles about the axis of twist 31 in order to obtain said blade.

For example, to that end, five basic profiles may be defined, bearing respective references I, II, III, IV and V hereinafter and presenting respective maximum relative thicknesses equal to 9.5%, 10.2%, 11.7%, 12.8% and 13.9%. Basic profile I will be used between R and 0.93 R, whilst profiles II, III, IV and V will be respectively disposed at the sections located at 0.845 R, 0.66 R, 0.53 R and 0.40 R. The definitions of such profiles are given hereinafter with respect to a system of rectangular axes OX, OY, which each have for origin the leading edge 28, the x-axis OX merging with the chord and being oriented from the leading edge 28 towards the trailing edge 29 (for profiles I, II, III and IV) or 34 (for profile V), as shown in FIGS. 6a to 6e.

A. Example of profile I having a maximum relative thickness equal to 9.5% and usable between R and 0.93 R (cf. FIG. 6a)

Such a profile I may be such that:
the reduced ordinates of its upper surface line 35 are given
between $X/1=0$ and $X/1=0.39433$, by the formula $$Y/1 = f1(X/1)^{\frac{1}{2}} + f2(X/1) + f3(X/1)^2 + f4(X/1)^3 + f5(X/1)^4 + f6(X1)^5 + f7(X/1)^6 \quad (1)$$

with
f1 = +0.16227
f2 = −0.11704.10$^{-1}$
f3 = +0.13247
f4 = −0.25016.10
f5 = +0.10682.10$^2$
f6 = −0.22210.10$^2$
f7 = +0.17726.10$^2$
between X/1 = 0.39433 and X/1 = 1, by the formula $$Y/1 = g0 + g1(X/1) + g2(X/1)^2 + g3(X/1)^3 + g4(X/1)^4 + g5(X/1)^5 + g6(X/1)^6 \quad (2)$$

with
g0 = +0.22968
g1 = −0.17493.10
g2 = +0.77952.10
g3 = −0.17457.10$^2$
g4 = +0.20845.10$^2$
g5 = −0.13004.10$^2$
g6 = +0.33371.10 whilst the reduced ordinates of the lower surface line 36 of the said profile are given
between X/1 = 0 and X/1 = 0.11862, by the formula $$Y/1 = h1(X/1)^{\frac{1}{2}} + h2(X/1) + h3(X/1)^2 + h4(X/1)^3 + h5(X/1)^4 + h6(X/1)^5 + h7(X/1)^6 \quad (3)$$

with
h1 = −0.13971
h2 = +0.10480.10$^{-3}$
h3 = +0.51698.10
h4 = −0.11297.10$^3$
h5 = +0.14695.10$^4$
h6 = −0.96403.10$^4$
h7 = +0.24769.10$^5$ between X/1 = 0.11862 and X/1 = 1, by the formula $$Y/1 = i0 + i1(X/1) + i2(X/1)^2 + i3(X/1)^3 + i4(X/1)^4 + i5(X/1)^5 + i6(X/1)^6 \quad (4)$$

with
i0 = −0.25915.10$^{-1}$
i1 = −0.96597.10$^{-1}$
i2 = +0.49503
i3 = +0.60418.10$^{-1}$
i4 = −0.17206.10
i5 = +0.20619.10
i6 = −0.77922

Figure 6A:
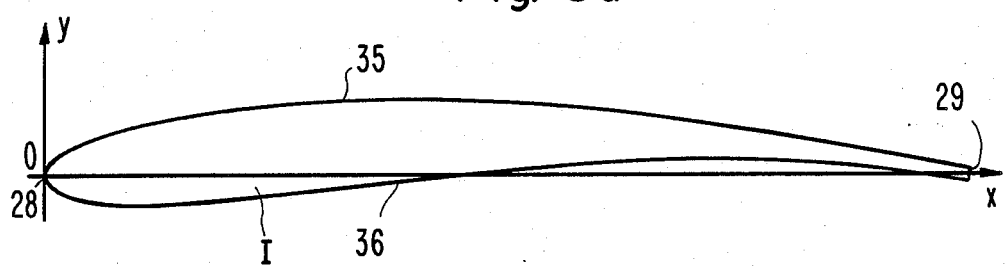
FIGS. 6a to 6e schematically show five profiles, referenced I to V, corresponding to five particular sections of the blade along its span.
Figure 6B:
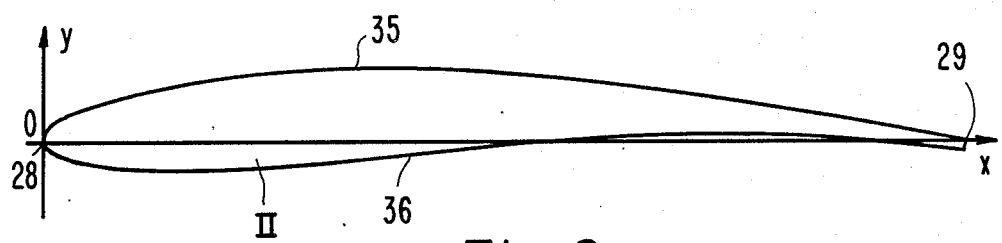

B. Example of profile II having a maximum relative thickness equal to 10.2% and usable for a blade section disposed at 0.845 R (FIG. 6b)

For this profile II:
the reduced ordinates of the upper surface line 35 are given
between X/1 = 0 and X/1 = 0.39503, by the formula $$Y/1 = j1(X/1)^{\frac{1}{2}} + j2(X/1) + j3(X/1)^2 + j4(X/1)^3 + j5(X/1)^4 + j6(X/1)^5 + j7(X/1)^6 \quad (5)$$

with
j1 = +0.14683
j2 = −0.67115.10$^{-2}$
j3 = +0.44720
j4 = −0.36828.10
j5 = +0.12651.10$^2$
j6 = −0.23835.10$^2$
j7 = +0.18155.10$^2$
between X/1 = 0.39503 and X/1 = 1, by the formula $$Y/1 = k0 + k1(X/1) + k2(X/1)^2 + k3(X/1)^3 + k4(X/1)^4 + k5(X/1)^5 + k6(X/1)^6 \quad (6)$$

with
k0 = +0.45955
k1 = −0.39834.10
k2 = +0.16726.10$^2$
k3 = −0.35737.10$^2$
k4 = +0.41088.10$^2$
k5 = −0.24557.10$^2$
k6 = +0.60088.10 whilst the reduced ordinates of the lower surface line 36 of said profile are given
between X/1 = 0 and X/1 = 0.14473, by the formula $$Y/1 = m1(X/1)^{\frac{1}{2}} + m2(X/1) + m3(X/1)^2 + m4(X/1)^3 + m5(X/1)^4 + m6(X/1)^5 + m7(X/1)^6 \quad (7)$$

with
m1 = −0.13297
m2 = −0.36163.10$^{-1}$
m3 = +0.17284.10
m4 = −0.27664.10$^2$
m5 = +0.30633.10$^3$
m6 = −0.16978.10$^4$
m7 = +0.36477.10$^4$
between X/1 = 0.14473 and X/1 = 1, by the formula $$Y/1 = n0 + n1(X/1) + n2(X/1)^2 + n3(X/1)^3 + n4(X/1)^4 + n5(X/1)^5 + n6(X/1)^6 \quad (8)$$

with
n0 = −0.30824.10$^{-1}$
n1 = −0.20564.10$^{-1}$
n2 = −0.21738
n3 = +0.24105.10
n4 = −0.53752.10
n5 = +0.48110.10
n6 = −0.15826.10

Figure 6C:
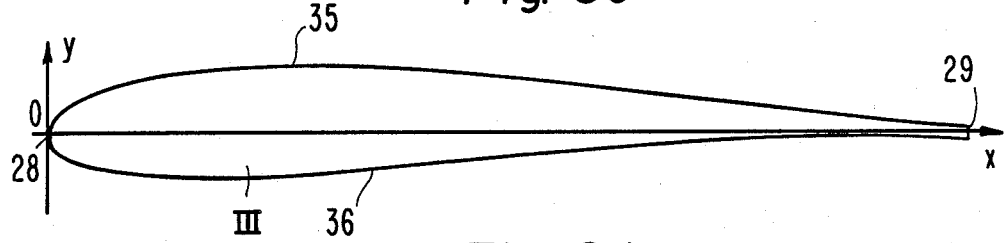

C. Example of profile III having a relative maximum thickness equal to 11.7% and usable for a blade section disposed at 0.66 R (FIG. 6c)

For this profile III,
the reduced ordinates of the upper surface line 35 are given
between X/1 = 0 and X/1 = 0.28515, by the formula $$Y/1 = t1(X/1)^{\frac{1}{2}} + t2(X/1) + t3(X/1)^2 + t4(X/1)^3 + t5(X/1)^4 + t6(X/1)^5 + t7(X/1)^6 \quad (9)$$

with
t1 = +0.21599
t2 = −0.17294
t3 = +0.22044.10
t4 = −0.26595.10$^2$
t5 = +0.14642.10$^3$
t6 = −0.39764.10$^3$
t7 = +0.42259.10$^3$
between X/1 = 0.28515 and X/1 = 1, by the formula $$Y/1 = u0 + u1(X/1) + u2(X/1)^2 + u3(X/1)^3 + u4(X/1)^4 + u5(X/1)^5 + u6(X/1)^6 \quad (10)$$

with
u0 = +0.39521.10$^{-1}$
u1 = +0.26170
u2 = −0.47274
u3 = −0.40872
u4 = +0.15968.10
u5 = −0.15222.10
u6 = +0.51057 whilst the reduced ordinates of the lower surface line 36 of said profile are given
between X/1 = 0 and X/1 = 0.17428, by the formula $$Y/l = v1(X/l)^{\frac{1}{2}} + v2(X/l) + v3(X/l)^2 + v4(X/l)^3 + v5(X/l)^4 + v6(X/l)^5 + v7(X/l)^6 \quad (11)$$

with
v1 = −0.16526
v2 = −0.31162.10$^{-1}$
v3 = +0.57567.10
v4 = −0.10148.10$^3$
v5 = +0.95843.10$^3$
v6 = −0.44161.10$^4$
v7 = +0.78519.10$^4$
between X/l = 0.17428 and X/l = 1, by the formula $$Y/l = w0 + w1(X/l) + w2(X/l)^2 + w3(X/l)^3 + w4(X/l)^4 + w5(X/l)^5 + w6(X/l)^6 \quad (12)$$

with
w0 = −0.25152.10$^{-1}$
w1 = −0.22525
w2 = +0.89038
w3 = −0.10131.10
w4 = +0.16240
w5 = +0.46968
w6 = −0.26400

Figure 6D:
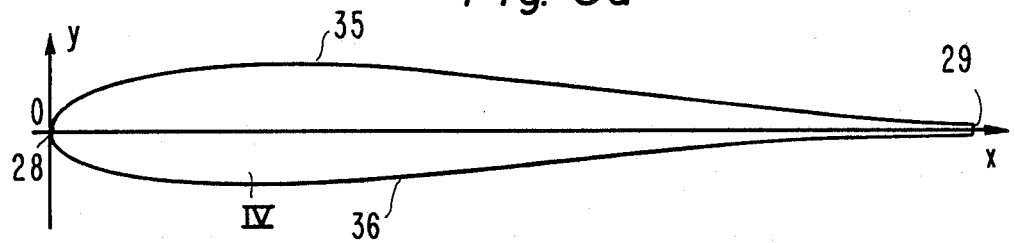

D. Example of profile IV having a maximum relative thickness equal to 12.8% and usable for a blade section disposed at 0.53 R (FIG. 6d)

For this profile IV,
the reduced ordinates of the upper surface line 35 are given
between X/l = 0 and X/l = 0.26861, by the formula $$Y/l = \alpha 1(X/l)^{\frac{1}{2}} + \alpha 2(X/l) + \alpha 3(X/l)^2 + \alpha 4(X/l)^3 + \alpha 5(X/l)^4 + \alpha 6(X/l)^5 + \alpha 7(X/l)^6 \quad (13)$$

with
$\alpha 1$ = +0.19762
$\alpha 2$ = +0.17213
$\alpha 3$ = −0.53137.10
$\alpha 4$ = +0.56025.10$^2$
$\alpha 5$ = −0.32319.10$^3$
$\alpha 6$ = +0.92088.10$^3$
$\alpha 7$ = −0.10229.10$^4$
between X/l = 0.26861 and X/l = 1, by the formula $$Y/l = \beta 0 + \beta 1(X/l) + \beta 2(X/l)^2 + \beta 3(X/l)^3 + \beta 4(X/l)^4 + \beta 5(X/l)^5 + \beta 6(X/l)^6 \quad (14)$$

with
$\beta 0$ = +0.28999.10$^{-1}$
$\beta 1$ = +0.38869
$\beta 2$ = −0.10798.10
$\beta 3$ = +0.80848
$\beta 4$ = +0.45025
$\beta 5$ = −0.10636.10
$\beta 6$ = +0.47182 whilst the reduced ordinates of the lower surface line 36 of said profile are given
between X/l = 0 and X/l = 0.20934, by the formula $$Y/l = \gamma 1(X/l)^{\frac{1}{2}} + \gamma 2(X/l) + \gamma 3(X/l)^2 + \gamma 4(X/l)^3 + \gamma 5(X/l)^4 + \gamma 6(X/l)^5 + \gamma 7(X/l)^6 \quad (15)$$

with
$\gamma 1$ = −0.25376
$\gamma 2$ = +0.61860
$\gamma 3$ = −0.96212.10
$\gamma 4$ = +0.12843.10$^3$
$\gamma 5$ = −0.90701.10$^3$
$\gamma 6$ = +0.32291.10$^4$
$\gamma 7$ = −0.45418.10$^4$
between X/l = 0.20934 and X/l = 1, by the formula $$Y/l = \delta 0 + \delta 1(X/l) + \delta 2(X/l)^2 + \delta 3(X/l)^3 + \delta 4(X/l)^4 + \delta 5(X/l)^5 + \delta 6(X/l)^6 \quad (16)$$

with
$\delta 0$ = −0.25234.10$^{-1}$
$\delta 1$ = −0.23995
$\delta 2$ = +0.10890.10
$\delta 3$ = −0.10066.10
$\delta 4$ = −0.32520
$\delta 5$ = +0.11326.10
$\delta 6$ = −0.64043

Figure 6E:
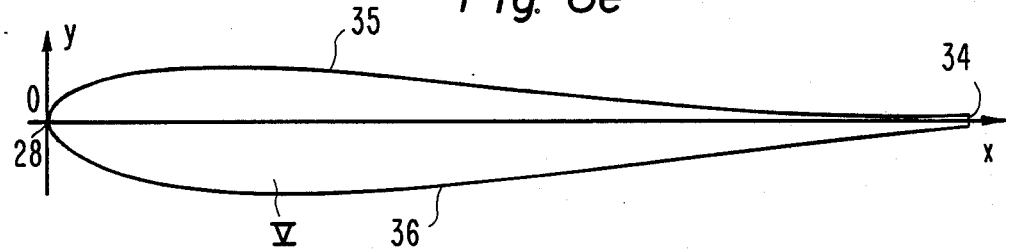

E. Example of profile V having a maximum relative thickness equal to 13.9% and usable for a section of blade root disposed at 0.40 R (FIG. 6e)

For this profile V,
the reduced ordinates of the upper surface line 35 are given
between X/l = 0 and X/l = 0.19606, by the formula $$Y/l = \epsilon 1(X/l)^{\frac{1}{2}} + \epsilon 2(X/l) + \epsilon 3(X/l)^2 + \epsilon 4(X/l)^3 + \epsilon 5(X/l)^4 + \epsilon 6(X/l)^5 + \epsilon 7(X/l)^6 \quad (17)$$

with
$\epsilon 1$ = +0.22917
$\epsilon 2$ = −0.22972
$\epsilon 3$ = +0.21262.10
$\epsilon 4$ = −0.39557.10$^2$
$\epsilon 5$ = +0.32628.10$^3$
$\epsilon 6$ = −0.13077.10$^4$
$\epsilon 7$ = +0.20370.10$^4$
between X/l = 0.19606 and X/l = 1, by the formula $$Y/l = \lambda 0 + \lambda 1(X/l) + \lambda 2(X/l)^2 + \lambda 3(X/l)^3 + \lambda 4(X/l)^4 + \lambda 5(X/l)^5 + \lambda 6(X/l)^6 \quad (18)$$

with
$\lambda 0$ = +0.32500.10$^{-1}$
$\lambda 1$ = +0.29684
$\lambda 2$ = −0.99723
$\lambda 3$ = +0.82973
$\lambda 4$ = +0.40616
$\lambda 5$ = −0.10053.10
$\lambda 6$ = +0.44222 whilst the reduced ordinates of the lower surface line 36 of said profile are given
between X/l = 0 and X/l = 0.26478, by the formula $$Y/l = \mu 1(X/l)^{\frac{1}{2}} + \mu 2(X/l) + \mu 3(X/l)^2 + \mu 4(X/l)^3 + \mu 5(X/l)^4 + \mu 6(X/l)^5 + \mu 7(X/l)^6 \quad (19)$$

with
$\mu 1$ = −0.19314
$\mu 2$ = −0.22031
$\mu 3$ = +0.44399.10
$\mu 4$ = −0.41389.10$^2$
$\mu 5$ = +0.23230.10$^3$
$\mu 6$ = −0.66179.10$^3$
$\mu 7$ = +0.74216.10$^3$
between X/l = 0.26478 and X/l = 1, by the formula $$Y/l = \nu 0 + \nu 1(X/l) + \nu 2(X/l)^2 + \nu 3(X/l)^3 + \nu 4(X/l)^4 + \nu 5(X/l)^5 + \nu 6(X/l)^6 \quad (20)$$

with
$\nu 0$ = −0.42417.10$^{-1}$
$\nu 1$ = −0.29161
$\nu 2$ = +0.57883
$\nu 3$ = +0.41309
$\nu 4$ = −0.19045.10
$\nu 5$ = +0.18776.10

$v6 = -0.63583$

Figure 7:
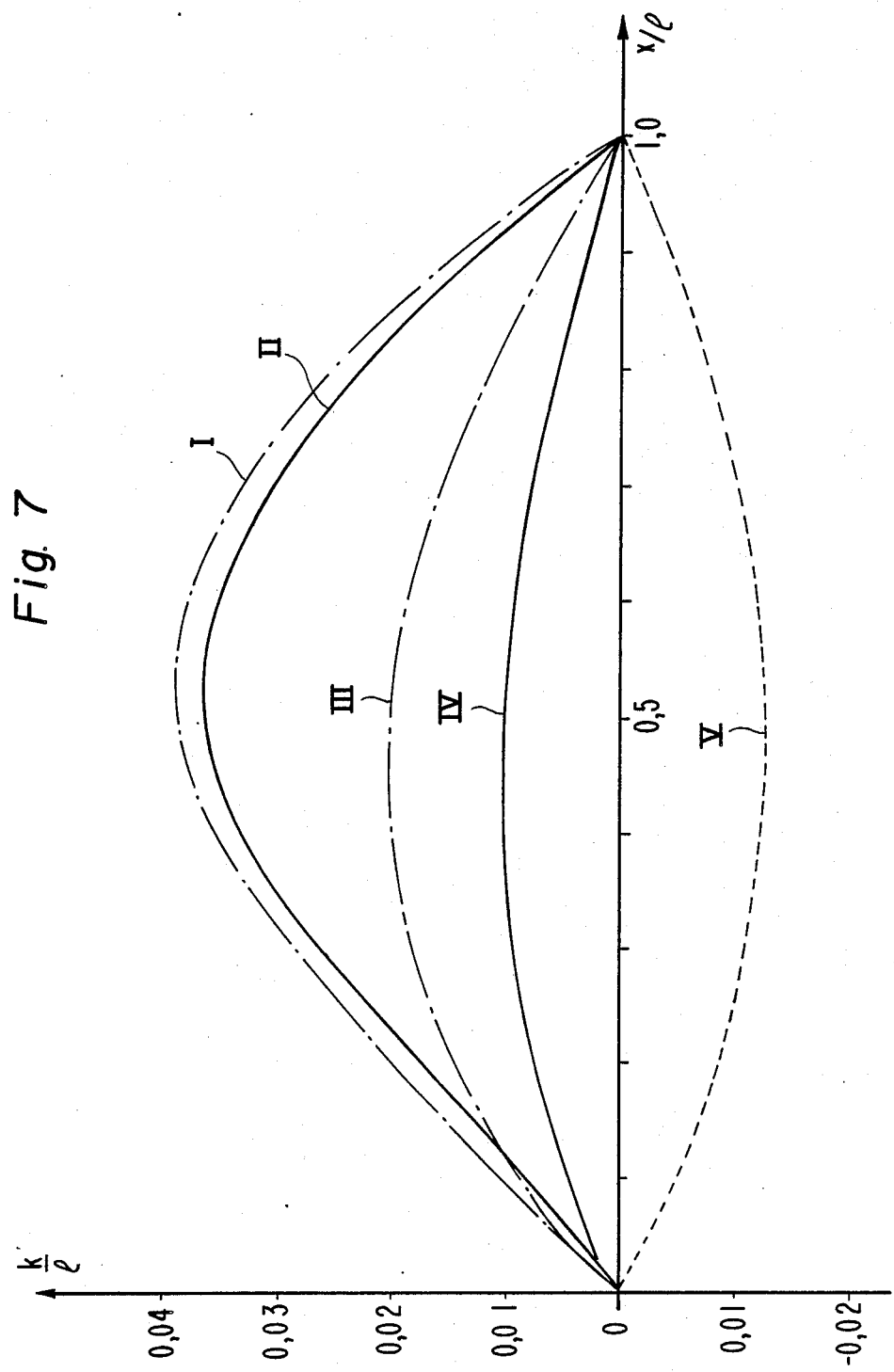
FIG. 7 is a diagram showing the camber of profiles I to V of FIGS. 6a to 6e.

FIG. 7 shows the evolution of the maximum relative camber K/1 of each of said profiles I to V as a function of the reduced abscissa X/1.

These different profiles I to V, defined hereinabove with the aid of specific equations, in fact form part of a family of profiles of which each may be determined by a law of variation of thickness and a law of camber along the chord of the profile, in accordance with the technique which is defined on page 112 of the report "Theory of wing sections" by H. ABOTT and E. VON DOENHOFF published in 1949 by McGRAW HILL BOOK Company, Inc. and according to which the coordinates of a profile are obtained by plotting on either side of the median line and perpendicularly thereto, the half-thickness at that point.

In order to define the profiles of the family to which profiles I to V belong, the following analytic formulae are advantageously used for the median line and the law of thickness:

for the median line:

$$Y/1 = c1(X/1) + c2(X/1)^2 + c3(X/1)^3 + c4(X/1)^4 + c5(X/1)^5 + c6(X/1)^6 + c7(X/1)^7 \quad (21)$$

for the law of thickness:

$$ye/1 = b1(X/1) + b2(X/1)^2 + b3(X/1)^3 + b4(X/1)^4 + b5(X/1)^5 + b6(X/1)^6 + b7(X/1)^7 + b8(X/1)^8 + b9(X/1)^9 + b10(X/1)^{10} \quad (22)$$

For the profiles of the blades according to the invention, of which the relative thickness is included between 9% and 15%, each coefficient b1 to b10 of formula (22) may advantageously be defined by corresponding formula (23.1) to (23.10), given hereinafter:

$$b1 = b11(e/1) + b12(e/1)^2 + b13(e/1)^3 + b14(e/1)^4 + b15(e/1)^5 + b16(e/1)^6 \quad (23.1)$$

$$b2 = b21(e/1) + b22(e/1)^2 + b23(e/1)^3 + b24(e/1)^4 + b25(e/1)^5 + b26(e/1)^6 \quad (23.2)$$

$$b10 = b101(e/1) + b102(e/1)^2 + b103(e/1)^3 + b104(e/1)^4 + b105(e/1)^5 + b106(e/1)^6 \quad (23.10)$$

The different coefficients b11 to b106 then have the following values:

| | |
|---|---|
| $b11$ | $= +0,98542.10^5$ |
| $b12$ | $= -0,43028.10^7$ |
| $b13$ | $= +0,74825.10^8$ |
| $b14$ | $= -0,64769.10^9$ |
| $b15$ | $= +0,27908.10^{10}$ |
| $b16$ | $= -0,47889.10^{10}$ |
| $b21$ | $= -0,33352.10^7$ |
| $b22$ | $= +0,14610.10^9$ |
| $b23$ | $= -0,25480.10^{10}$ |
| $b24$ | $= +0,22115.10^{11}$ |
| $b25$ | $= -0,95525.10^{11}$ |
| $b26$ | $= -0,16428.10^{12}$ |
| $b31$ | $= +0,39832.10^8$ |
| $b32$ | $= -0,17465.10^{10}$ |
| $b33$ | $= +0,30488.10^{11}$ |
| $b34$ | $= -0,26484.10^{12}$ |
| $b35$ | $= -0,11449.10^{13}$ |
| $b36$ | $= -0,19704.10^{13}$ |
| $b41$ | $= -0,24305.10^9$ |
| $b42$ | $= +0,10661.10^{11}$ |
| $b43$ | $= -0,18618.10^{12}$ |
| $b44$ | $= +0,16178.10^{13}$ |
| $b45$ | $= -0,69957.10^{13}$ |
| $b46$ | $= +0,12043.10^{14}$ |
| $b51$ | $= +0,86049.10^9$ |
| $b52$ | $= -0,37753.10^{11}$ |
| $b53$ | $= +0,65939.10^{12}$ |
| $b54$ | $= -0,57309.10^{13}$ |
| $b55$ | $= +0,24785.10^{14}$ |
| $b56$ | $= -0,42674.10^{14}$ |
| $b61$ | $= -0,18709.10^{10}$ |
| $b62$ | $= +0,82093.10^{11}$ |
| $b63$ | $= -0,14340.10^{13}$ |
| $b64$ | $= +0,12464.10^{14}$ |
| $b65$ | $= -0,53912.10^{14}$ |
| $b66$ | $= +0,92831.10^{14}$ |
| $b71$ | $= +0,25348.10^{10}$ |
| $b72$ | $= -0,11123.10^{12}$ |
| $b73$ | $= +0,19432.10^{13}$ |
| $b74$ | $= -0,16892.10^{14}$ |
| $b75$ | $= +0,73066.10^{14}$ |
| $b76$ | $= -0,12582.10^{15}$ |
| $b81$ | $= -0,20869.10^{10}$ |
| $b82$ | $= +0,91583.10^{11}$ |
| $b83$ | $= -0,16000.10^{13}$ |
| $b84$ | $= +0,13909.10^{14}$ |
| $b85$ | $= -0,60166.10^{14}$ |
| $b86$ | $= +0,10361.10^{15}$ |
| $b91$ | $= +0,95554.10^9$ |
| $b92$ | $= -0,41936.10^{11}$ |
| $b93$ | $= +0,73266.10^{12}$ |
| $b94$ | $= -0,63693.10^{13}$ |
| $b95$ | $= +0,27553.10^{14}$ |
| $b96$ | $= -0,47450.10^{14}$ |
| $b101$ | $= -0,18663.10$ |
| $b102$ | $= +0,81909.10^{10}$ |
| $b103$ | $= -0,14311.10^{12}$ |
| $b104$ | $= +0,12441.10^{12}$ |
| $b105$ | $= -0,58321.10^{13}$ |
| $b106$ | $= +0,92688.10^{13}$ |

Similarly, for maximum relative cambers of median line included between $-2\%$ and $+5\%$ of the chord, each coefficient c1 to c7 of formula (21) giving the pattern of the median line may advantageously be defined by corresponding formula (24.1) to (24.7), given hereinafter:

$$c1 = c11(e/1) + c12(e/1)^2 - c13(e/1)^3 + c14(e/1)^4 + c15(e/1)^5 + c16(e/1)^6 \quad (24.1)$$

$$c2 = c21(e/1) + c22(e/1)^2 + c23(e/1)^3 + c24(e/1)^4 + c25(e/1)^5 + c26(e/1)^6 \quad (24.2)$$

$$c7 = c71(e/1) + c72(e/1)^2 + c73(e/1)^3 + c74(e/1)^4 + c75(e/1)^5 + c76(e/1)^6 \quad (24.7)$$

The different coefficients c11 to c76 advantageously present the following values:

| | |
|---|---|
| $c11$ | $= -0,29874.10^1$ |
| $c12$ | $= -0,61332.10^2$ |
| $c13$ | $= +0,60890.10^5$ |
| $c14$ | $= -0,43208.10^6$ |
| $c15$ | $= -0,12037.10^9$ |
| $c16$ | $= +0,24680.10^{10}$ |
| $c21$ | $= +0,17666.10^2$ |
| $c22$ | $= +0,70530.10^4$ |
| $c23$ | $= -0,40637.10^6$ |
| $c24$ | $= -0,28310.10^8$ |
| $c25$ | $= +0,20813.10^{10}$ |
| $c26$ | $= -0,31463.10^{11}$ |
| $c31$ | $= -0,38189.10^3$ |
| $c32$ | $= +0,31787.10^2$ |
| $c33$ | $= +0,23684.10^4$ |
| $c34$ | $= -0,47636.10^8$ |
| $c35$ | $= -0,26705.10^{10}$ |
| $c36$ | $= +0,65378.10^{11}$ |
| $c41$ | $= +0,13180.10^4$ |
| $c42$ | $= -0,44650.10^5$ |
| $c43$ | $= -0,65945.10^7$ |

-continued $$c_{44} = -0,35822.10^9$$
$$c_{45} = -0,24986.10^{10}$$
$$c_{46} = -0,58675.10^{11}$$
$$c_{51} = -0,18750.10^4$$
$$c_{52} = +0,72410.10^5$$
$$c_{53} = +0,90745.10^7$$
$$c_{54} = -0,54687.10^9$$
$$c_{55} = +0,58423.10^{10}$$
$$c_{56} = +0,50242.10^{11}$$
$$c_{61} = +0,12366.10^4$$
$$c_{62} = -0,43178.10^5$$
$$c_{63} = -0,61307.10^7$$
$$c_{64} = +0,33946.10^9$$
$$c_{65} = -0,26651.10^{10}$$
$$c_{66} = -0,49209.10^{11}$$
$$c_{71} = -0,31247.10^3$$
$$c_{72} = -0,83939.10^4$$
$$c_{73} = +0,16280.10^7$$
$$c_{74} = -0,74431.10^8$$
$$c_{75} = +0,30520.10^8$$
$$c_{76} = -0,21265.10^{11}$$

The above analytic formulae make it possible, once the evolution of the law of thickness as a function of the span of the blade (cf. FIG. 5d) and the evolution of the maximum camber with the span (cf. FIG. 5b) have been chosen, to define the geometry of the complete blade.

In order to check the efficiency of the present invention, a tail rotor arrangement, of the type described with reference to FIGS. 1 and 2, was constructed and the following experiments were carried out:

(a) Firstly, the rotary hub 10 was equipped with thirteen blades 11, each constituted by the constant NACA 63A312 profile, with constant twist, and the curve giving the figure of merit FM of said arrangement was plotted as a function of the mean coefficient of lift per blade $\overline{Cz}$, which is defined by the formula $$\overline{Cz} = \frac{3T}{\delta \rho b l\, R\, U^2}$$

in which T, $\delta$, $\rho$, l and R are respectively the total thrust or pull of the rotor, the coefficient of diffusion of the aerodynamic flux, the density of the air, the chord of the blade and the radius of the propeller, as defined hereinabove, b is the number of blades and U the peripheral speed of the propeller.

Curve A of FIG. 8 was obtained.

(b) The preceding thirteen blades were then replaced by thirteen blades according to the present invention and the measurements were repeated.

Curve B of FIG. 8 was obtained.

These curves show that the maximum figure of merit FM and the maximum mean coefficient of lift per blade of the rotor arrangement tested under (b) are respectively greater by 2.8% and by 8% with respect to the corresponding magnitudes of the rotor arrangement tested under (a).

It is also seen from these curves that the improvement of the figure of merit is obtained whatever the mean load level per blade.

What is claimed is:

1. A blade for shrouded propeller comprising a tunnel and a rotor with multiple blades coaxial to said tunnel, said rotor comprising a rotating hub of which the radius is of the order of 40% that of said tunnel and on which said blades are mounted via blade shanks, wherein:
   in plan, the aerodynamically active part of said blade presents, beyond the blade shank, a rectangular shape with the result that the successive profiles constituting said aerodynamically active part all have the same chord 1 and that the end section of said aerodynamically active part is straight; and,
   along the span of the blade counted from the axis of the tunnel, between a first section of which the relative span is close to 45% and the end section of said blade:
      the maximum relative camber of the successive profiles constituting said aerodynamically active part of the blade is positive and increases from a value close to 0 to a value close to 0.04;
      the twist of said aerodynamically active part of the blade decreases from a first value close to 12° at said first section to a second value close to 4° at a second section of which the relative span is close to 0.86, then increases from this second section to a third value close to 4.5° at said end section of blade; and
      the maximum relative thickness of said successive profiles decreases from a value close to 13.5% to a value close to 9.5%.

2. The shrouded propeller blade of claim 1, wherein said maximum relative camber increases virtually linearly from this value close to 0 to a value equal to 0.036 for a relative span equal to 0.845, passing through values 0.01 and 0.02 respectively for the relative spans 0.53 and 0.66, then increases from this value equal to 0.036 for the relative span equal to 0.845 up to a value equal to 0.038 for the relative span equal to 0.93, and, finally, is constant and equal to 0.038 between the relative spans 0.93 and 1.

3. The shrouded propeller blade of claim 1, wherein the root of said blade presents evolutive profiles of which the maximum relative camber is negative and increases from a value substantially equal to $-0.013$ for a relative span equal to 0.40 to said value close to 0 for a relative span equal to 0.45.

4. The shrouded propeller blade of claim 1, wherein, between the relative spans 0.45 and 1, the evolution of the twist is at least substantially parabolic, with a minimum for the relative span of 0.86.

5. The shrouded propeller blade of claim 4, wherein the axis of twist of said aerodynamically active part is parallel to the line of leading edge and to the line of trailing edge thereof and is distant from said line of leading edge by a distance approximately equal to 39% of the length of the chord of the profiles.

6. The shrouded propeller blade of claim 5, wherein the twist of the root of said blade increases from said value close to 8° for a relative span close to 0.38 to said value close to 12° for the relative span equal to 0.45.

7. The shrouded propeller blade of claim 1, wherein the maximum relative thickness of the profiles decreases linearly from a value close to 13.9% for a relative span equal to 0.40 to a value close to 9.5% for a relative span equal to 0.93, and is constant and equal to said value close to 9.5% between the relative spans respectively equal to 0.93 and 1.

8. The shrouded propeller blade of claim 7, wherein the portion of the aerodynamically active part included between the relative spans 0.93 and 1 is constituted by a profile (I) having a maximum relative thickness equal to 9.5% and such that, as a function of the reduced abscissa $X/1$ along the chord, counted from the leading edge,
   the reduced ordinates of its upper surface line (35) are given
      between $X/1 = 0$ and $X/1 = 0.39433$, by the formula $$Y/l = f1(X/l)^{\frac{1}{2}} + f2(X/l) + f3(X/l)^2 + f4(X/l)^3 + f5(X/l)^4 + f6(X/l)^5 + f7(X/l)^6 \quad (1)$$

with
f1 = +0.16227
f2 = −0.11704.10⁻¹
f3 = +0.13247
f4 = −0.25016.10
f5 = +0.10682.10²
f6 = −0.22210.10²
f7 = +0.17726.10²
between X/l = 0.39433 and X/l = 1, by the formula $$Y/l = g0 + g1(X/l) + g2(X/l)^2 + g3(X/l)^3 + g4(X/l)^4 + g5(X/l)^5 + g6(X/l)^6 \quad (2)$$

with
g0 = +0.22968
g1 = −0.17493.10
g2 = +0.77952.10
g3 = −0.17457.10²
g4 = +0.20845.10²
g5 = −0.13004.10²
g6 = +0.33371.10 whilst the reduced ordinates of the lower surface line 36 of the said profile are given
between X/l = 0 and X/l = 0.11862, by the formula $$Y/l = h1(X/l)^{\frac{1}{2}} + h2(X/l) + h3(X/l)^2 + h4(X/l)^3 + h5(X/l)^4 + h6(X/l)^5 + h7(X/l)^6 \quad (3)$$

with
h1 = −0.13971
h2 = +0.10480.10⁻³
h3 = +0.51698.10
h4 = −0.11297.10³
h5 = +0.14695.10⁴
h6 = −0.96403.10⁴
h7 = +0.24769.10⁵
between X/l = 0.11862 and X/l = 1, by the formula $$Y/l = i0 + i1(X/l) + i2(X/l)^2 + i3(X/l)^3 + i4(X/l)^4 + i5(X/l)^5 + i6(X/l)^6 \quad (4)$$

with
i0 = −0.25915.10⁻¹
i1 = −0.96597.10⁻¹
i2 = +0.49503
i3 = +0.60418.10⁻¹
i4 = −0.17206.10
i5 = +0.20619.10
i6 = −0.77922.

9. The shrouded propeller blade of claim 7, wherein the profile of the blade section disposed at the relative span of 0.845 has a maximum relative thickness equal to 10.2% and is such that, as a function of the reduced abscissa X/l along the chord, counted from the leading edge, the reduced ordinates of the upper surface line (35) are given
between X/l = 0 and X/l = 0.39503, by the formula $$Y/l = j1(X/l)^{\frac{1}{2}} + j2(X/l) + j3(X/l)^2 + j4(X/l)^3 + j5(X/l)^4 + j6(X/l)^5 + j7(X/l)^6 \quad (5)$$

with
j1 = +0.14683
j2 = −0.67115.10⁻²
j3 = +0.44720
j4 = −0.36828.10
j5 = +0.12651.10²
j6 = −0.23835.10²
j7 = +0.18155.10² between X/l = 0.39503 and X/l = 1, by the formula $$Y/l = k0 + k1(X/l) + k2(X/l)^2 + k3(X/l)^3 + k4(X/l)^4 + k5(X/l)^5 + k6(X/l)^6 \quad (6)$$

with
k0 = +0.45955
k1 = −0.39834.10
k2 = +0.16726.10²
k3 = −0.35737.10²
k4 = +0.41088.10²
k5 = −0.24557.10²
k6 = +0.60088.10 whilst the reduced ordinates of the lower surface line (36) of said profile are given
between X/l = 0 and X/l = 0.14473, by the formula $$Y/l = m1(X/l)^{\frac{1}{2}} + m2(X/l) + m3(X/l)^2 + m4(X/l)^3 + m5(X/l)^4 + m6(X/l)^5 + m7(X/l)^6 \quad (7)$$

with
m1 = −0.13297
m2 = +0.36163.10⁻¹
m3 = +0.17284.10
m4 = −0.27664.10²
m5 = +0.30633.10³
m6 = −0.16978.10⁴
m7 = +0.36477.10⁴
between X/l = 0.14473 and X/l = 1, by the formula $$Y/l = n0 + n1(X/l) + n2(X/l)^2 + n3(X/l)^3 + n4(X/l)^4 + n5(X/l)^5 + n6(X/l)^6 \quad (8)$$

with
n0 = −0.30824.10⁻¹
n1 = −0.20564.10⁻¹
n2 = −0.21738
n3 = +0.24105.10
n4 = −0.53752.10
n5 = +0.48110.10
n6 = −0.15826.10.

10. The shrouded propeller blade of claim 7, wherein the profile of the blade section disposed at the relative span of 0.66 has a maximum relative thickness equal to 11.7% and is such that, as a function of the reduced abscissa X/l along the chord, counted from the leading edge, the reduced ordinates of the upper surface line are given
between X/l = 0 and X/l = 0.28515, by the formula $$Y/l = t1(X/l)^{\frac{1}{2}} + t2(X/l) + t3(X/l)^2 + t4(X/l)^3 + t5(X/l)^4 + t6(X/l)^5 + t7(X/l)^6 \quad (9)$$

with
t1 = +0.21599
t2 = −0.17294
t3 = +0.22044.10
t4 = −0.26595.10²
t5 = +0.14642.10³
t6 = −0.39764.10³
t7 = +0.42259.10³
between X/l = 0.28515 and X/l = 1, by the formula $$Y/l = u0 + u1(X/l) + u2(X/l)^2 + u3(X/l)^3 + u4(X/l)^4 + u5(X/l)^5 + u6(X/l)^6 \quad (10)$$

with
u0 = +0.39521.10⁻¹
u1 = +0.26170
u2 = −0.47274
u3 = −0.40872
u4 = +0.15968.10 u5 = −0.15222.10
u6 = +0.51057
whilst the reduced ordinates of the lower surface line of said profile are given
between X/1 = 0 and X/1 = 0.17428, by the formula $$Y/1 = v1(X/1)^{\frac{1}{2}} + v2(X/1) + v3(X/1)^2 + v4(X/1)^3 + v5(X/1)^4 + v6(X/1)^5 + v7(X/1)^6 \quad (11)$$

with
v1 = −0.16526
v2 = −0.31162.10⁻¹
v3 = +0.57567.10
v4 = −0.10148.10³
v5 = +0.95843.10³
v6 = −0.44161.10⁴
v7 = +0.78519.10⁴
between X/1 = 0.17428 and X/1 = 1, by the formula $$Y/1 = w0 + w1(X/1) + w2(X/1)^2 + w3(X/1)^3 + w4(X/1)^4 + w5(X/1)^5 + w6(X/1)^6 \quad (12)$$

with
w0 = −0.25152.10⁻¹
w1 = −0.22525
w2 = +0.89038
w3 = −0.10131.10
w4 = +0.16240
w5 = +0.46968
w6 = −0.26400.

11. The shrouded propeller blade of claim 7, wherein the profile of the blade section disposed at the relative span 0.53 R has a maximum relative thickness equal to 13.8% and is such that, as a function of the reduced abscissa X/1 along the chord, counted from the leading edge, the reduced ordinates of the upper surface line are given
between X/1 = 0 and X/1 = 0.26861, by the formula $$Y/1 = \alpha1(X/1)^{\frac{1}{2}} + \alpha2(X/1) + \alpha3(X/1)^2 + \alpha4(X/1)^3 + \alpha5(X/1)^4 + \alpha6(X/1)^5 + \alpha7(X/1)^6 \quad (13)$$

with
$\alpha1 = +0.19762$
$\alpha2 = +0.17213$
$\alpha3 = −0.53137.10$
$\alpha4 = +0.56025.10^2$
$\alpha5 = −0.32319.10^3$
$\alpha6 = +0.92088.10^3$
$\alpha7 = −0.10229.10^4$
between X/1 = 0.26861 and X/1 = 1, by the formula $$Y/1 = \beta0 + \beta1(X/1) + \beta2(X/1)^2 + \beta3(X/1)^3 + \beta4(X/1)^4 + \beta5(X/1)^5 + \beta6(X/1)^6 \quad (14)$$

with
$\beta0 = +0.28999.10^{-1}$
$\beta1 = +0.38869$
$\beta2 = −0.10798.10$
$\beta3 = +0.80848$
$\beta4 = +0.45025$
$\beta5 = −0.10636.10$
$\beta6 = +0.47182$
whilst the reduced ordinates of the lower surface line of said profile are given
between X/1 = 0 and X/1 = 0.20934, by the formula $$Y/1 = \gamma1(X/1)^{\frac{1}{2}} + \gamma2(X/1) + \gamma3(X/1)^2 + \gamma4(X/1)^3 + \gamma5(X/1)^4 + \gamma6(X/1)^5 + \gamma7(X/1)^6 \quad (15)$$

with
$\gamma1 = −0.25376$
$\gamma2 = +0.61860$
$\gamma3 = −0.96212.10$
$\gamma4 = +0.12843.10^3$
$\gamma5 = −0.90701.10^3$
$\gamma6 = +0.32291.10^4$
$\gamma7 = −0.45418.10^4$
between X/1 = 0.20934 and X/1 = 1, by the formula $$Y/1 = \delta0 + \delta1(X/1) + \delta2(X/1)^2 + \delta3(X/1)^3 + \delta4(X/1)^4 + \delta5(X/1)^5 + \delta6(X/1)^6 \quad (16)$$

with
$\delta0 = −0.25234.10^{-1}$
$\delta1 = −0.23995$
$\delta2 = +0.10890.10$
$\delta3 = −0.10066.10$
$\delta4 = −0.32520$
$\delta5 = +0.11326.10$
$\delta6 = −0.64043.$

12. The shrouded propeller blade of claim 7, wherein the profile of the section of blade root disposed at the relative span of 0.40 has a maximum relative thickness equal to 13.9% and is such that, as a function of the reduced abscissa X/1 along the chord, counted from the leading edge, the reduced ordinates of the upper surface line are given
between X/1 = 0 and X/1 = 0.19606, by the formula $$Y/1 = \epsilon1(X/1)^{\frac{1}{2}} + \epsilon2(X/1) + \epsilon3(X/1)^2 + \epsilon4(X/1)^3 + \epsilon5(X/1)^4 + \epsilon6(X/1)^5 + \epsilon7(X/1)^6 \quad (17)$$

with
$\epsilon1 = +0.22917$
$\epsilon2 = −0.22972$
$\epsilon3 = +0.21262.10$
$\epsilon4 = −0.39557.10^2$
$\epsilon5 = +0.32628.10^3$
$\epsilon6 = −0.13077.10^4$
$\epsilon7 = +0.20370.10^4$
between X/1 = 0.19606 and X/1 = 1, by the formula $$Y/1 = \lambda0 + \lambda1(X/1) + \lambda2(X/1)^2 + \lambda3(X/1)^3 + \lambda4(X/1)^4 + \lambda5(X/1)^5 + \lambda6(X/1)^6 \quad (18)$$

with
$\lambda0 = +0.32500.10^{-1}$
$\lambda1 = +0.29684$
$\lambda2 = −0.99723$
$\lambda3 = +0.82973$
$\lambda4 = +0.40616$
$\lambda5 = −0.10053.10$
$\lambda6 = +0.44222$
whilst the reduced ordinates of the lower surface line of said profile are given
between X/1 = 0 and X/1 = 0.26478, by the formula $$Y/1 = \mu1(X/1)^{\frac{1}{2}} + \mu2(X/1) + \mu3(X/1)^2 + \mu4(X/1)^3 + \mu5(X/1)^4 + \mu6(X/1)^5 + \mu7(X/1)^6 \quad (19)$$

with
$\mu1 = −0.19314$
$\mu2 = −0.22031$
$\mu3 = +0.44399.10$
$\mu4 = −0.41389.10^2$
$\mu5 = +0.23230.10^3$
$\mu6 = −0.66179.10^3$
$\mu7 = +0.74216.10^3$
between X/1 = 0.26478 and X/1 = 1, by the formula $$Y/1 = \nu0 + \nu1(X/1) + \nu2(X/1)^2 + \nu3(X/1)^3 + \nu4(X/1)^4 + \nu5(X/1)^5 + \nu6(X/1)^6 \quad (20)$$

with
$\nu 0 = -0.42417 \cdot 10^{-1}$
$\nu 1 = -0.29161$
$\nu 2 = +0.57883$
$\nu 3 = +0.41309$
$\nu 4 = -0.19045 \cdot 10$
$\nu 5 = +0.18776 \cdot 10$
$\nu 6 = -0.63583.$

* * * * *